Figure 1:
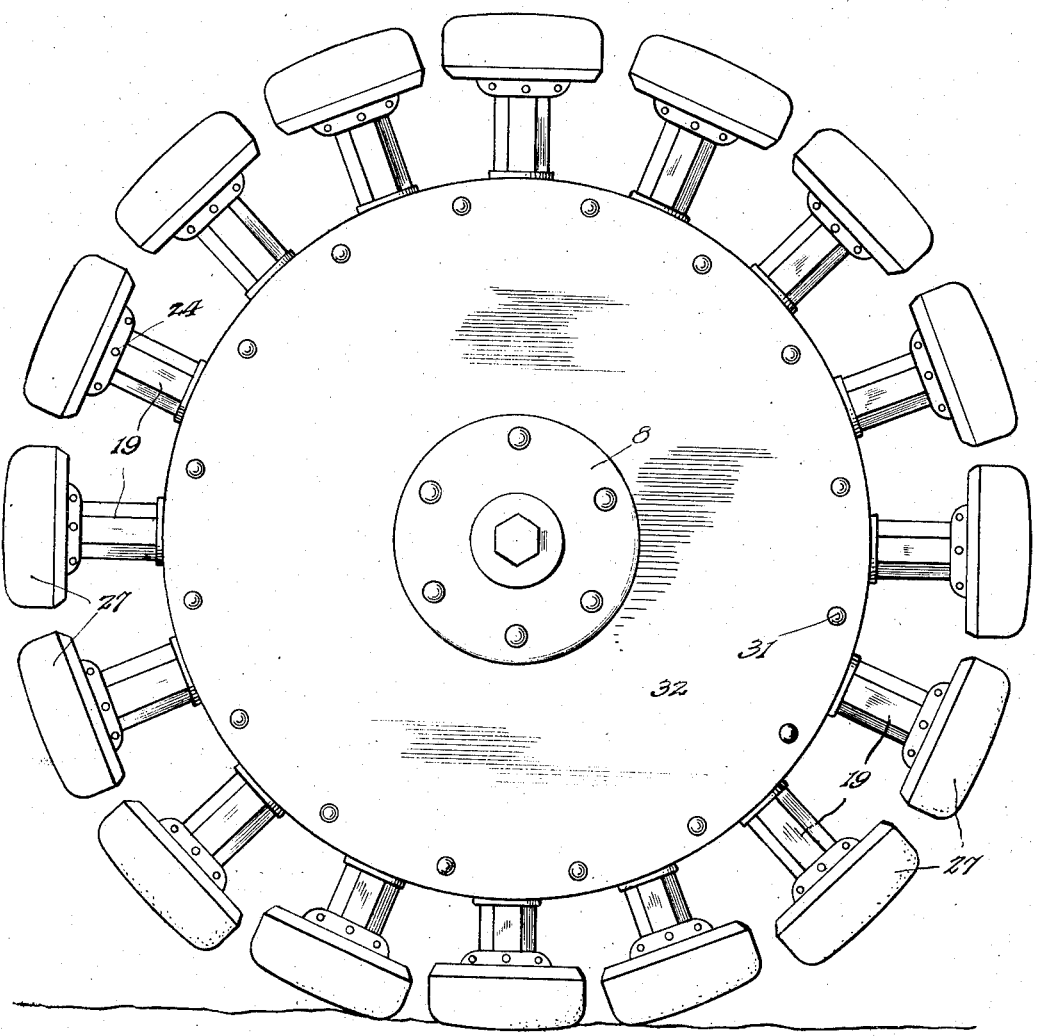

Jan. 27, 1925.

J. A. VANDENBERG 1,524,373

RESILIENT VEHICLE WHEEL

Filed Feb. 11, 1924

3 Sheets-Sheet 1

Inventor
John A. Vandenberg

By H. B. Willson & Co.

Attorneys

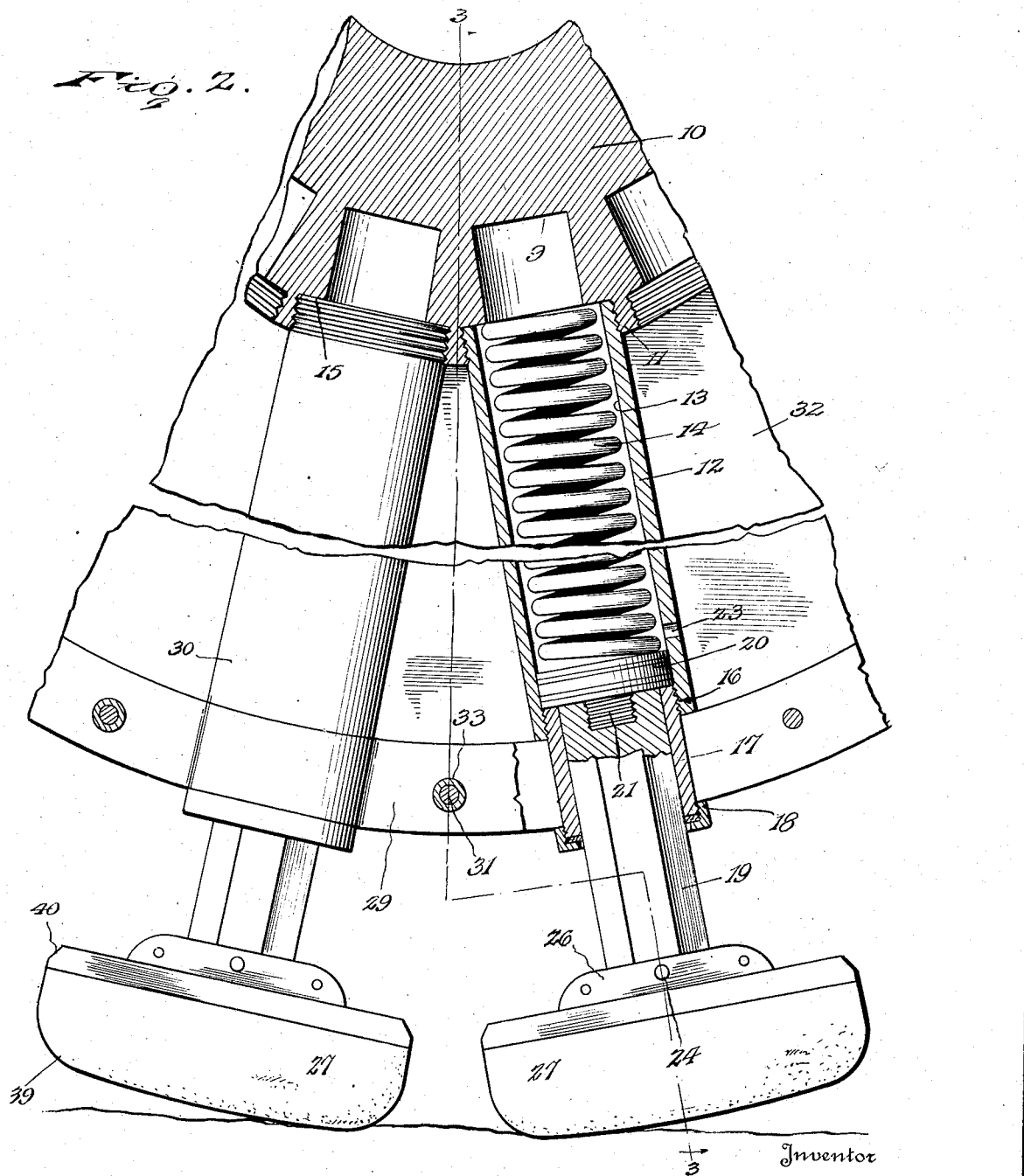

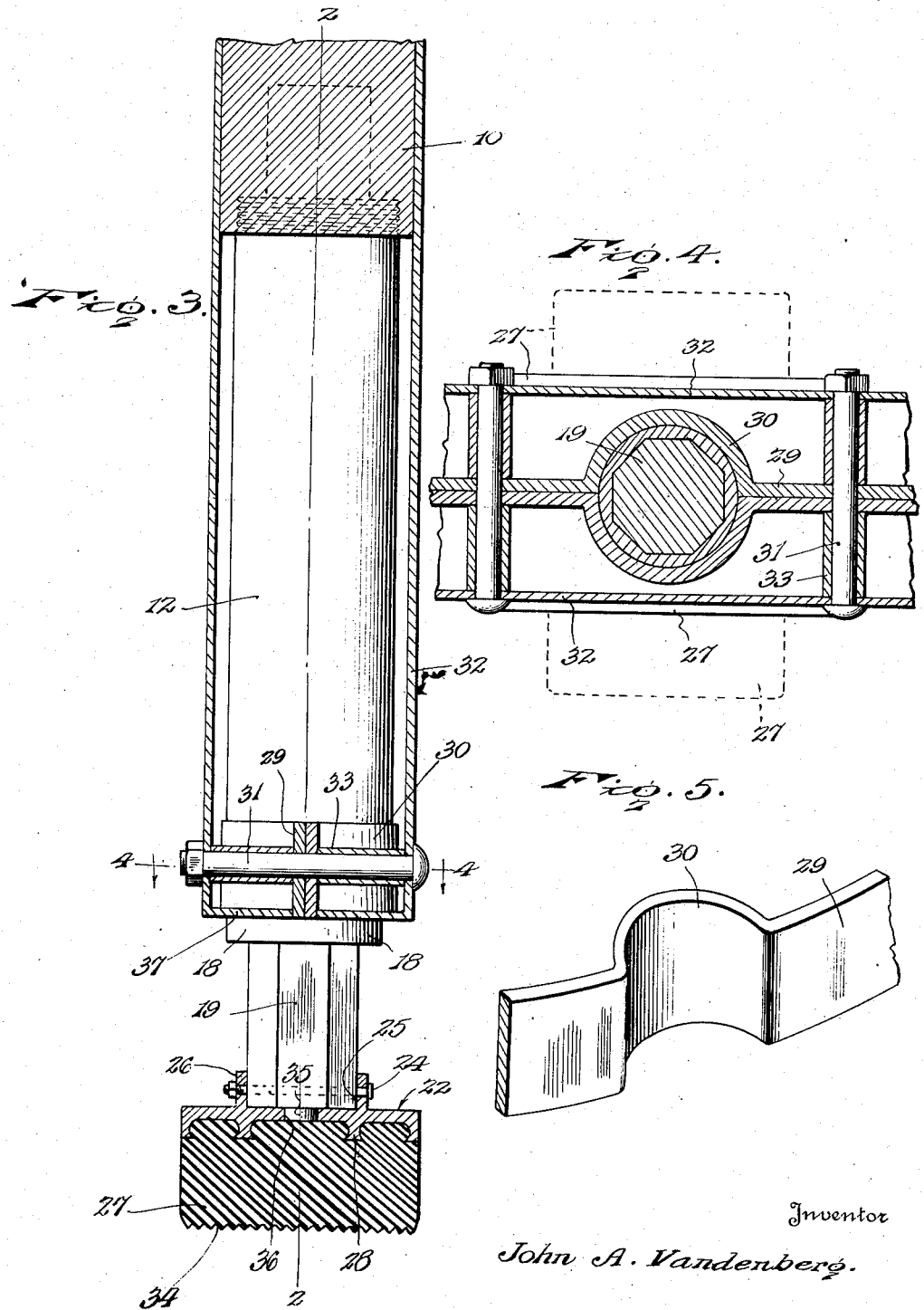

Patented Jan. 27, 1925.

1,524,373

UNITED STATES PATENT OFFICE.

JOHN A. VANDENBERG, OF LYNN, MASSACHUSETTS.

RESILIENT VEHICLE WHEEL.

Application filed February 11, 1924. Serial No. 692,174.

*To all whom it may concern:*

Be it known that I, JOHN A. VANDENBERG, a citizen of the United States, residing at Lynn, in the county of Essex and State of Massachusetts, have invented certain new and useful Improvements in Resilient Vehicle Wheels, and do declare the following to be a full, clear, and exact description of the invention, such as will enable others skilled in the art to which it appertains to make and use the same.

The present invention relates to resilient vehicle wheels and the object of the invention is to provide such a wheel with a series of shoes in place of a pneumatic tire thus producing an interrupted tread. Instead of the endless tire now used on such vehicle wheels, this wheel has feet placed around the circumference thereof and these perform, as nearly as possible, the action of an animal while walking or running. As an animal is sure footed and does not skid and can go uphill and down grade unaffected by climatic conditions or the seasons of the year and does not bounce on a rough road or give any jolts to its own body, the aim of this invention is to construct a wheel having the same qualities as nearly as possible.

Tire manufacturers have done wonders in producing good pneumatic tires to diminish friction and effect easy running, but shocks, incident to the bouncing motion while going at high speed even on the best of roads, still occur with present day pneumatic tires. Such tires are, moreover, unable to withstand the effect of broken glass, nails or other sharp objects on the roadway and it is accordingly necessary to carry spare wheels on automobiles when traveling long distances. The upkeep of the tires for automobiles is accordingly a great expense not to mention the annoyance experienced from a blow out on the road far from any repair station.

In order to remedy these defects in automobile wheels the present invention aims at producing a wheel that is strong and reliable and cannot blow out or be punctured and a wheel that is more resilient than one having an air cushion tire. The wheel forming the subject-matter of the present invention is accordingly constructed with a plurality of legs terminating with feet and rubber shoes, these legs taking the place of ordinary wheel spokes and being made resilient in radial direction.

In the accompanying drawings, one embodiment of the invention is illustrated, and Figure 1 is a side elevation of the wheel;
Figure 2 is a section along line 2—2 of Figure 3;
Figure 3 is a section along line 3—3 of Figure 2;
Figure 4 is a transverse section along line 4—4 of Figure 3, and
Figure 5 is a fragmentary perspective view of the annular band connecting the spokes or legs.

In the drawings, reference numeral 10 represents the hub of a wheel and is shown in the drawings as being applied to a front wheel, reference numeral 8 representing the outer hub flange keyed and bolted thereon in any suitable way, forming no part of the patentable novelty in this application. A rear or driving wheel would have the hub slightly modified and carry the usual brake band. The hub 10 is preferably solid metal disc provided with a plurality of radially directed sockets 11, sixteen of these sockets being indicated. These sockets are threaded and have counter-bores 9 of smaller diameter. In each socket is tightly threaded a spoke or tubular leg 12 forming a rigid connection with the hub. The tubular leg 12 is cylindrical and provides a chamber 13 for one or more coiled compression springs 14 abutting at the inner end against a shoulder 15 formed at the juncture between the socket 11 and the counter-bore 9. The outer end of the tubular leg 12 is internally threaded, as at 16, and adapted to receive a knee or guide member 17. The knee or guide member has accordingly a cylindrical outer face but is preferably of polygonal cross section inside, the drawings showing octagonal. The outer end of the knee is threaded to receive a dust cap or washer 18 which also serves as a collar.

The knee or guide member 17 is adapted to receive an ankle member 19 adapted to reciprocate in the octagonally constructed interior of the knee or guide member 17 and the angle member is accordingly a comparatively short solid bar of the same cross section. At its inner end the ankle member carries a piston 20 having a shank 21 of smaller diameter threaded in the end of the ankle member 19. The piston 20 fits snugly in the bore of the tubular leg 12 and the air contained in the counter-bore 9 and the chamber 13 of this leg forms a cushion against which the piston 20 acts, as well as acting against the spring 14. One or more small air vents 23 are provided near the outer end of the tubular leg 12. These air vents may also be used as oil holes.

At the outer end of the octagonal ankle member 19 is secured a foot 22 by screws or bolts 24 which foot for this reason, is furnished with a raised portion 26 on its upper side provided with a socket 25 in which the outer end of the ankle member 19 engages thus providing a very rigid connection which is further strengthened by the lug 35 at the outer end of the bar engaging in a corresponding aperture 36 in the foot 22. The foot carries a shoe 27 and may be provided with ribs 28 on its outer side embedded in the shoe 27 and the latter may have a roughened or corrugated tread 34.

In order to stiffen the construction annular bands 29 are provided to connect the knee or guide members 17. These bands which may be made in sections are preferably two in number, one on the inside and one on the outside of the members 17, and the bands have depressions 30 of semi-circular contour adapted to fit closely around the sides of the knees or guide members 17. Between adjacent members 17 the annular bands 29 are provided with apertures adapted to receive clamping bolts 31.

A sheet metal plate 32 is provided on each end of the hub 10 having an outer diameter corresponding to the added radial distances between the collars 18 of two alined legs. These plates 32 form dust shields having inwardly turned flanges 37 at the outer peripheries and also strengthen the wheel and the two plates are held together by the clamping bolts 31 which engage in suitable apertures provided in the plates and registering respectively with the apertures shown in the annular bands 29. Between the plates and the bands are preferably inserted spacing sleeves or pipes 33 so that the bolts 31 when drawn up tightly connect the shield plates as well as the annular bands in position.

The object of making the ankle members 19 polygonal and preferably octagonal in cross section is to make the position of the feet and shoes adjustable around their axes according to the condition of the road to be traveled over. Usually on good roads the shoes which are long and narrow all stand in the same vertical plane as seen in Figures 1 and 2 but in order to make the wheel skid-proof each ankle member 19 may be turned upon its axis 45 or 90° when inserted in the knee or guide member 17. In this manner the feet and shoes would stand transversely to the vertical plane of the wheel. The shoes may thus be arranged parallel in their length direction or turned alternately to the right and the left out of the vertical plane if set at a 45° angle. A position of the shoe at right angles to the plane of the wheel is indicated by dotted lines in Figure 4. By setting the shoes at an angle in this manner the wheel will get a better grip on the ground and prevent skidding very effectually. It is evident that instead of an octagonal cross section of the knee and ankle member any other polygonal cross section may be used, as, for instance, square, when it will also be possible to place the shoes at a 90° angle against the vertical plane of the wheel. It would be particularly advantageous to place the shoes at 90° or transversely to the vertical plane for ascending very steep grades up mountain sides, for instance.

To assemble the wheel the cap 18 is first screwed on the outer end of the knee or guide member 17. The knee or guide member is inserted in the outer end of the tubular leg 12 and drawn up tightly in the threads. The piston 20 is thereupon threaded into the inner end of the ankle member 19 and the latter inserted from the inner end of the tubular leg 12 until the ankle member 19 protrudes beyond the cap 18 and the piston 20 abuts against the inner end of the knee or guide member 17. The piston 20, chamber 13 and coil spring 14 should be well lubricated with graphite. The spring is now dropped into the chamber 13 of the tubular leg 12. The parts thus assembled are then attached to the hub 10 by screwing the threaded end of the tubular leg 12 into the threaded socket 11 in the hub. Finally, the foot 22 together with the attached shoe 27 is secured to the outer end of the ankle member 19 at the desired angle to the vertical plane of the wheel. The other legs and feet are assembled in the same manner in the hub until all the sixteen legs are in position. The inner and outer annular bands 29 are thereupon placed in position on the knee or guide member 17 and a shield 32 on each side of the hub and the shields and the bands are secured together by means of the clamping bolts 31 and the spacing sleeves or pipes 33.

The wheels are built of best material and for the tubular legs and knee members, steel tubing is preferably used. The springs are made from heavy wire of malleable steel, each spring being strong enough to carry the entire weight regardless of the air compression. The ankle members are made of solid steel or aluminum alloy and the piston 20 may have a metallic packing or be made of oil-proof rubber. The feet each consist of a flexible steel plate with a socket at its inner side adapted to receive an ankle member, and to the outer sides of the feet are vulcanized solid india rubber blocks which are rounded on the ends, as at 39, and have their tread portions arched to coincide with the normal periphery of the wheel. The ends of the feet are preferably beveled as at 40. If necessary the tread portions of the shoes instead of being corrugated may be corded or have inserted friction plugs. For a wheel of normally thirty-five inches diameter the shoes should be about five to five and one-half inches long and three to three and one-half inches wide which would permit of approximately one inch space between two shoes. Should the shoes be under exceedingly heavy strain they would be pushed in the entire permissible distance in the legs and the one inch space would then be taken up and the part of the wheel touching the ground would substantially form a solid rubber tired wheel for a length of two or three shoes. Heavier shoes would naturally be used for winter traffic.

The dust shields and the annular bands are preferably made of rust-proof sheet steel or aluminum alloy flanged to form a cylinder closed at its outer periphery.

The wheels may be manufactured in any size, heavier for trucks and motor cars in general but lighter for motorcycles and aeroplanes. In the case of aeroplanes the wheels may be secured on the axle and the latter connected with the engine, in this manner being used for starting, and when the aeroplane is descending the wheels may be reversed to stop it in a greatly reduced time and distance without giving any undue jar to the delicate construction of the plane.

The shoes of the wheels will at all times take a firm grip on the road surface and are especially valuable on slippery roads, because as soon as one foot leaves the road the next one takes a fresh hold in another place. This construction is particularly valuable for lifting a vehicle out of a rut as when one foot is down in a depression another foot ahead thereof will engage a higher point in the rut, in this manner obtaining a stepped engagement with the roadway and not a sliding one as with a continuous tire.

The cushioning and shock-absorbing is done mainly in the air and spring chambers of the legs, the chambers 13 being practically air tight after the pistons 20 have passed the vents 23, while the solid rubber feet take away the harshness of the jolts so that such jolts are not communicated to the car itself.

Another advantage gained by constructing the wheel shoes in this manner is that as the shoes naturally wear more at the front end than at the read end, they may be reversed in the legs so that the less worn rear ends are presented forwardly. It will be a comparatively easy matter to replace a damaged shoe as compared with the replacing of a tire on an ordinary pneumatic wheel and it will be much easier to carry spare parts for the legs and the shoes than to carry an entire spare wheel as is now the case.

Another advantage that this wheel possesses is that when it is used on a hydroplane the wheel may be kept turning when the plane is in the water and with the shoes set crossways they will form paddles to propel the plane.

To change the angular position of a shoe with regard to the vertical plane of the wheel, this may be done by removing the bolts 24 and detaching the foot 22 from the ankle member 19, then setting the foot 22 back on the ankle member 19 in the desired angular position and securing it by means of the bolts 24, it being of course necessary that additional bolt holes be formed through the outer ends of the members 19, either at the time of manufacturing the wheels or when the feet 22 are to be moved to a different angle.

Automobiles or trucks equipped with these wheels as described may be used very successfully in winter, in going over ice or icy roads, by clamping on over the rubber tread portion of each shoe (34) a fitted frame (of any preferred make) provided with small, sharp, steel points, or cogs, which will naturally dig in, and take a firm grip on the iced surfaces.

If preferred, the frame may be made of flexible rust-proof steel of a continuous, or circular contour, and provided with inserted cogs, on its outer periphery, the strain will be taken care of by the series of cushioned legs.

Having thus described the invention, what is claimed as new is:—

1. A resilient wheel comprising a hub, spokes radiating therefrom and consisting of yieldably connected inner and outer telescopic sections, said inner sections being rigidly secured to the hub, tread members on the outer ends of the outer sections, a pair of opposed rings at opposite sides of the inner sections of the spokes and contacting with each other between said sections, a pair of circular side plates extending from the hub to the outer ends of said inner spoke sections and having inwardly extended contacting flanges at their peripheral edges, spacing sleeves interposed between the contacting portions of said rings and said side plates, and bolts passing through said side plates, said sleeves and said contacting portions of said rings.

2. A resilient wheel comprising a hub, inner tubular spoke sections rigidly connected with and radiating from said hub, guide members threaded into the outer ends of said inner spoke sections, outer spoke sections passing slidably through said guide members and having tread members at their outer ends, means within the inner spoke sections for cushioning the inward movement of the outer spoke sections, a pair of opposed rings having bowed portions embracing said guide members and abutting the outer ends of said inner spoke sections, said rings being in contact with each other between said guide members, a pair of circular side plates contacting with opposite sides of the hub and extending therefrom substantially to the peripheral edges of said rings, the peripheral edges of said side plates having inwardly directed contacting flanges, spacing sleeves interposed between said side plates and the contacting portions of the aforesaid rings, and bolts passing through said side plates, said spacing sleeves and said rings.

3. A resilient wheel comprising a hub, inner tubular spoke sections rigidly connected with and radiating from said hub, the outer ends of said spoke sections having guide members each formed with a poly-sided interior, poly-sided outer spoke sections passing slidably through said guide members and having elongated tread members at their outer ends, said outer spoke sections being capable of reception in said guide members when turned to different positions about their longitudinal axes, to dispose the tread members at different angles to the plane of the wheel, and means within the inner spoke sections for cushioning the inward movement of said outer spoke sections.

4. A resilient wheel comprising a hub, spokes radiating therefrom, and each consisting of telescopic yieldably associated inner and outer sections, said outer sections having poly-sided outer ends, tread members having poly-sided sockets receiving said poly-sided outer ends of said outer spoke sections, and means for detachably securing said poly-sided spoke ends in said poly-sided sockets.

5. A resilient wheel construction comprising a hub, tubular spokes rigidly united with said hub, a tread member for each spoke mounted to reciprocate therein, and means adapted to yieldably hold the tread member in extended position; said tread member including a ground engaging shoe of resilient material having its tread surface elongated; a guide member for said tread member associated with the spoke and permitting adjustment of the tread member on the axis of the spoke for setting the shoe in selective angular positions relative to the vertical plane of the wheel.

6. A resilient wheel construction comprising a hub, tubular spokes rigidly connected with said hub, a tread member for each spoke, a guide member for said tread member secured in the outer end of the spoke and having keyed engagement with the tread member permitting adjustment of the tread member on the axis of the spoke, an air chamber being provided in said spoke, a piston carried by said tread member, and a spring in said chamber tending to hold the tread member in extended position, a vent being provided for said chamber adjacent the piston when in said position.

7. A resilient wheel construction comprising a hub, tubular spokes rigidly connected with said hub, a tread member for each spoke, a guide member for said tread member secured in the outer end of the spoke and having keyed engagement with the tread member permitting adjustment of the tread member on the axis of the spoke, an air chamber being provided in said spoke, a piston carried by said tread member, a spring in said chamber tending to hold the tread member in extended position, a vent being provided for said chamber adjacent the piston when in said position, said tread member including a metallic shank slidably engaging with said guide member, and a ground-engaging rubber shoe rigidly secured to the free end of said shank.

8. A resilient wheel construction comprising a hub, tubular spokes rigidly connected with said hub, a tread member for each spoke, a guide member for said tread member secured in the outer end of the spoke and having keyed engagement with the tread member permitting adjustment of the tread member on the axis of the spoke, an air chamber being provided in said spoke, a piston carried by said tread member, a spring in said chamber tending to hold the tread member in extended position, a vent being provided for said chamber adjacent the piston when in said position, said tread member including a metallic shank slidably engaging with said guide member, a ground-engaging rubber shoe rigidly secured to the free end of said shank; annular bands connecting said guide members, and securing means for said bands.

9. A resilient wheel construction comprising a hub, tubular spokes rigidly connected with said hub, a tread member for each spoke, a guide member for said tread member secured in the outer end of the spoke and having keyed engagement with the tread member permitting adjustment of the tread member on the the axis of the spoke, an air chamber being provided in said spoke, a piston carried by said tread member, a spring in said chamber tending to hold the tread member in extended position, a vent being provided for said chamber adjacent the piston when in said position, said tread member including a metallic shank slidably engaging with said guide member, a ground-engaging rubber shoe rigidly secured to the free end of said shank, annular bands connecting said guide members, and securing means for said bands, a shield plate for each side of the hub, the outer peripheries of said shield plates and said bands coinciding, and said securing means for the bands engaging said shield plates.

10. A resilient wheel construction comprising a hub, tubular spokes rigidly connected with said hub, a tread member for each spoke, a guide member for said tread member secured in the outer end of the spoke and having keyed engagement with the tread member permitting adjustment of the tread member on the axis of the spoke, an air chamber being provided in said spoke, a piston carried by said tread member, a spring in said chamber tending to hold the tread member in extended position, a vent being provided for said chamber adjacent the piston when in said position, said tread member including a metallic shank of polygonal cross section, and a ground-engaging rubber shoe at the free end of said shank.

11. A resilient wheel construction comprising a hub, tubular spokes rigidly connected with said hub, a tread member for each spoke, a guide member for said tread member secured in the outer end of the spoke and having keyed engagement with the tread member permitting adjustment of the tread member on the axis of the spoke, an air chamber being provided in said spoke, a piston carried by said tread member, a spring in said chamber tending to hold the tread member in extended position, a vent being provided for said chamber adjacent the piston when in said position, said tread member including a metallic shank of polygonal cross section, a ground-engaging rubber shoe at the free end of said shank; annular bands connecting said guide members, and securing means for said bands, a shield plate for each side of the hub, the outer peripheries of said shield plates and said bands coinciding, and said securing means for the bands engaging said shield plates.

12. A resilient wheel construction comprising a hub, tubular spokes rigidly secured in said hub, a tread member for each spoke having axial yieldable engagement therewith, said tread member including a shank of polygonal cross section and a rubber shoe, and means for adjusting the angular position of said shoe with regard to the axis of the spoke.

In testimony whereof I have hereunto set my hand in the presence of two subscribing witnesses.

JOHN A. VANDENBERG.

Witnesses:
  ELEANOR F. GOVE,
  THOMAS S. BUBIER.